June 17, 1958 — L. KEAN — 2,838,780
SELF-CLEANING SCRAPER
Filed Oct. 22, 1954
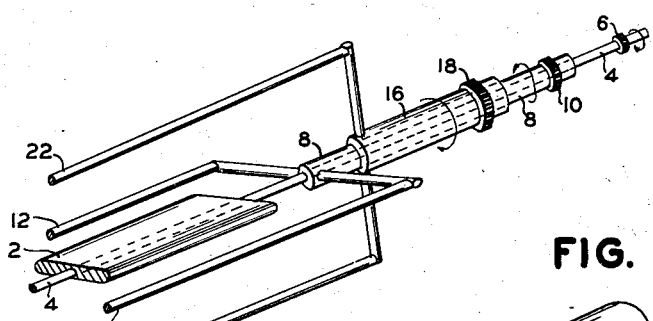
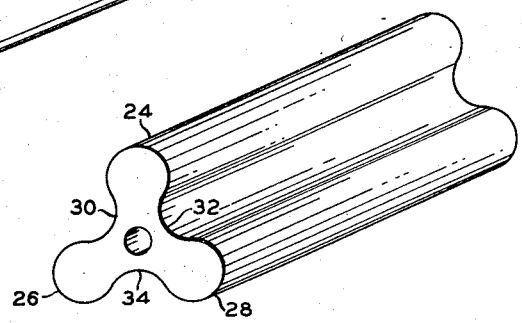
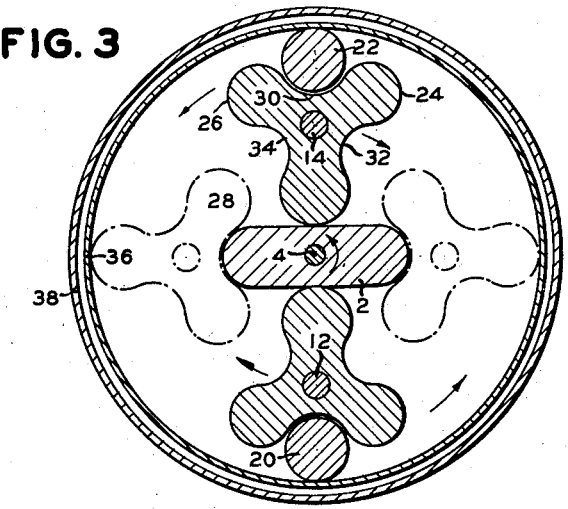
INVENTOR.
LEONARD KEAN
BY
ATTORNEYS

United States Patent Office 2,838,780
Patented June 17, 1958

2,838,780

SELF-CLEANING SCRAPER

Leonard Kean, New York, N. Y., assignor, by mesne assignments, to Minnesota Mining and Manufacturing Company, St. Paul, Minn., a corporation of Delaware Application October 22, 1954, Serial No. 463,890

3 Claims. (Cl. 15—104.13)

This invention relates to a self-cleaning scraper having particular utility in cleaning polymer from the walls of vessels in which it is prepared, handled, or dried.

The device of the present invention is of general application for use in any vessel or container in which material builds up on the walls, either in the preparation of the material or in the treating or handling thereof. For example, in the preparation of polychlorotrifluoroethylene the polymer is discharged in wet condition from a polymerizer and passed through a jacketed pipe dried from which it emerges as a dry powder. During the passage of the wet polymer through the pipe, however, the polymer builds up on the walls and finally plugs the pipe.

The device of the present invention is of particular utility in such a pipe drier or in the polymerizer itself, since it exerts a continuous scraping and wiping action upon the walls of the vessel in which it is placed, and it also continually cleans the wiping and scraping surfaces automatically. Every wiping and scraping blade is cleaned during each revolution of the device, but the device itself occupies only a small amount of the free space within the vessel in which it is employed, thus providing ample free space to permit evacuation of the material being prepared, treated, or handled.

Referring to the accompanying drawings in which:

Figure 1 is a fragmentary perspective view of a portion of the self-cleaning scraper of the invention.

Figure 2 is a perspective view of a rotatable 3-leaf scraper blade, which is a portion of the complete self-cleaning scraper assembly, and Figure 3 is a transverse sectional view through a vessel showing the self-cleaning scraper of the invention operatively positioned therein.

Referring to Figure 1 of the drawings, an elongated member 2 is mounted on the end of shaft 4 having a gear 6 secured to the opposite end thereof. Mounted concentrically on the shaft 4 is a hollow shaft 8 having a gear 10 mounted at one end thereof, adjacent the gear 6, and having a pair of L-shaped supporting arms 12 and 14 secured to the opposite end thereof. A third hollow concentric shaft 16 is rotatably mounted on the shafts 4 and 8 and has a gear 18 on one end thereof and a pair of L-shaped scraping members 20 and 22 hereinafter referred to as a first scraper means secured to the opposite end thereof.

A detailed view is shown of one of the 3-leaf scraper blades in Figure 2 of the drawings, hereinafter referred to as a second scraper means, one of these 3-leaf scraper blades being rotatably mounted on each of the supporting arms 12 and 14 which pass through the center apertures in the 3-leaf scraper blades. As shown in the drawings, each of the 3-leaf scraper blades has a generally equiangular Y-shaped configuration and has three scraping and wiping surfaces 24, 26, and 28 and three generally arcuate connecting surfaces 30, 32, and 34.

The concentric shafts and gears shown at the righthand side of Figure 1 may be duplicated on the left-hand side of the scraper mechanism, if desired, in order to provide support at both ends of the device for the wiping and scraping members 20 and 22 and the rotatable 3-leaf scraper blade supports, or the device may be supported from one end only and inserted in a vessel from one end thereof, if desired.

In Figure 3 of the drawings the device is shown as it would appear from one end of a vessel in which it is mounted, the vessel being provided with an inner wall 36 and a jacket 38. A heat transfer medium is passed through the annular space in the vessel and may be steam, hot water, or any other conventional heat transfer medium known to the art.

In the operation of the device of the invention, the shafts 4 and 16 are rotated at the same speed and in the same direction, and this may be accomplished by connecting the gears 6 and 18 to any conventional power source such as an electric motor. Alternatively, the shafts 4 and 16 may be connected by a yoke mechanism, for example, to assure that they are driven at the same speed and are maintained in the same relative position. The shaft 16 must be positioned relative to the shaft 4 at all times so that a plane passing through the centers of the scraping and wiping members 20 and 22 passes through the center of the elongated member 2 perpendicularly to the central longitudinal plane of the elongated member 2, as shown in Figure 3 of the drawings. It is necessary that this relative position of these members be maintained in order to obtain the desired wiping, scraping, and self-cleaning action of the device.

The shaft 8 is rotated in the opposite direction to the direction of rotation of the shafts 4 and 16, and this may be accomplished by connecting the gear 10 to any conventional source of power, such as an electric motor. As will be seen from Figure 3 of the drawing, the 3-leaf scraper blades are rotatably mounted on the supporting arms 12 and 14 at radii from the center of the elongated member 2 which are less than the radii of the circles described by the rotation of the scraping and wiping members 20 and 22, these radii also being greater than the radius of the greatest circle described by the rotation of the elongated member 2.

In Figure 3 of the drawings, the scraping and wiping members 20 and 22 and elongated member 2 are shown rotating in a counterclockwise direction, while the members 12 and 14, supporting, the 3-leaf scraper blades, are shown rotating in a clockwise direction. The distance from the center of the supports 12 and 14 to any of the wiping surfaces 24, 26, and 28 on the 3-leaf scraper blades is equivalent to the distance from the centers of the supporting members 12 and 14 to the wall of the vessel 36. Hence, as the scraping and wiping member 22, for example, continues its counterclockwise rotation from the position shown in Figure 3, it will rotate the 3-leaf scraper blade on the support 14 and bring the scraping and wiping surface 24 thereof into engagement with the wall of the vessel 36. As it does so, the scraping and wiping surface 28 of the 3-leaf scraper blade is caused to travel along the side of the elongated member 2, thereby scraping and wiping it clean of any material adhering thereto. As the rotation of the members relative to the wall of the vessel and to each other continues, the surfaces 24 of the 3-leaf scraper blades will scrape and wipe the wall of the vessel 36 until the 3-leaf scraper blades again abut against the scraping and wiping members 20 and 22.

As the two 3-leaf scraper blades rotate around the elongated member 2 wiping and scraping the wall of the vessel with the wiping and scraping surfaces 24, the generally arcuate connecting surfaces 34 on the 3-leaf scraper blades pass around the opposite ends of the elongated member 2 in contact therewith and are thereby wiped and scraped clean of any material adhering thereto. This sequence of operations is repeated each time the rotatable 3-leaf scraper blades abut against the scraping and wiping members 20 and 22, and thus it will be seen that each portion of the rotatable 3-leaf scraper blades is wiped and scraped clean of material as the device rotates, and any build-up of material on these scraping and wiping members 20 and 22 is eliminated by the wiping and scraping action exerted on these members by the rotatable 3-leaf scraper blades.

It is not necessary, of course, that the wiping and scraping members 20 and 22 and the rotatable 3-leaf scraper members all be rotated, but instead the supports of the 3-leaf scraper blades could be fixedly mounted within the vessel to be cleaned, if desired, and the scraping and wiping members 20 and 22 and the elongated member 2 could be rotated relative to the 3-leaf scraper blades. Also, one of the 3-leaf scraper blades could be eliminated, if desired, and the device could be operated with the remaining 3-leaf blade, although with reduced efficiency.

The device of the invention is also useful in many materials handling applications; for example, in transferring wet caked material through a jacketed pipe from one vessel to another, the wet material is simultaneously dried and churned into a powder during the transferring operation.

It will be obvious to those skilled in the art that many modifications may be made within the scope of the present invention without departing from the spirit thereof, and the invention includes all such modifications.

I claim:

1. In a device of the character described, flat elongated means adapted to be symmetrically mounted centrally of a vessel to be cleaned and rotatable about its longitudinal axis, a pair of first scraper means and located substantially in a plane perpendicular to the plane of the flat elongated means and rotatable as a unit about said longitudinal axis in the same direction as said flat elongated means to maintain said perpendicular relation with respect thereto, and a pair of second scraper means at a shorter radius from the center of the elongated means than said first scraper means having surfaces in proximity to the surfaces of said elongated means and said first scraper means, and rotatable as a unit about said longitudinal axis, the first and second scraper means being relatively rotatable with respect to each other.

2. The device defined in claim 1 in which said second scraper means have a plurality of scraping surfaces.

3. The device defined in claim 1 in which said second scraper means have substantially equiangular Y-shaped configurations, and each of said second scraper means being rotatable about an axis parallel to said longitudinal axis.

References Cited in the file of this patent

UNITED STATES PATENTS

| | | |
|---|---|---|
| 2,321,786 | Wotton | June 15, 1943 |
| 2,672,404 | Schultz | Mar. 16, 1954 |